United States Patent
Stoenescu et al.

(10) Patent No.: US 9,211,859 B1
(45) Date of Patent: Dec. 15, 2015

(54) MOTOR-VEHICLE FRONT STRUCTURE WITH AN IMPROVED FRONT-END UNIT

(71) Applicant: Fiat Group Automobiles S.p.A., Turin (IT)

(72) Inventors: Bogdan Stoenescu, Turin (IT); Marco Schierano, Caselle Torinese (IT); Rosario Iania, Frossasco (IT); Gianfranco Del Nero, Orbassano (IT)

(73) Assignee: FIAT GROUP AUTOMOBILES S.P.A., Turin (IT)

( * ) Notice: Subject to any disclaimer, the term of this patent is extended or adjusted under 35 U.S.C. 154(b) by 0 days.

(21) Appl. No.: 14/706,661

(22) Filed: May 7, 2015

(30) Foreign Application Priority Data

May 27, 2014 (IT) .............................. TO2014A0418

(51) Int. Cl.
| | |
|---|---|
| B60R 19/00 | (2006.01) |
| B60R 19/34 | (2006.01) |
| B60R 19/03 | (2006.01) |
| B60R 19/02 | (2006.01) |
| B60R 19/24 | (2006.01) |

(52) U.S. Cl.
CPC ............... B60R 19/34 (2013.01); B60R 19/023 (2013.01); B60R 19/03 (2013.01); *B60R 2019/242* (2013.01)

(58) Field of Classification Search
CPC ........ B60R 19/34; B60R 19/023; B60R 19/03
USPC ........... 296/187.09, 193.09, 203.02; 293/132, 293/133
See application file for complete search history.

(56) References Cited

U.S. PATENT DOCUMENTS

| | | | |
|---|---|---|---|
| 8,191,959 B2* | 6/2012 | Ritz | 296/187.09 |
| 2002/0047281 A1* | 4/2002 | Hartel et al. | 293/102 |
| 2010/0102577 A1* | 4/2010 | Ginja et al. | 293/102 |
| 2010/0213742 A1 | 8/2010 | Ritz | |
| 2014/0042775 A1* | 2/2014 | Steinmetz et al. | 296/187.09 |

FOREIGN PATENT DOCUMENTS

| | | |
|---|---|---|
| DE | 102004014073 A1 | 10/2005 |
| DE | 102006047419 A1 | 4/2008 |
| EP | 2301825 A2 | 3/2011 |
| EP | 2301825 A9 | 6/2011 |
| EP | 2301825 A3 | 9/2011 |
| FR | 2919567 A1 | 2/2009 |

OTHER PUBLICATIONS

Nov. 3, 2014 Search Report from corresponding Italian Patent Application No. TO2014000418.

* cited by examiner

*Primary Examiner* — Joseph D Pape
(74) *Attorney, Agent, or Firm* — Heslin Rothenberg Farley Mesiti, PC; Victor A. Cardona

(57) ABSTRACT

A motor-vehicle front structure includes a pair of longitudinal struts having front-ends to which two strut plates are secured. A front cross-member is located forwardly of the strut plates and has ends with two rearwardly facing crash-box plates connected to the front cross-member by two crash-box structures. The crash-box plates are connected to a lower auxiliary cross-member by two respective supports. A front-end unit for supporting one or more auxiliary motor-vehicle components has an upper cross-member and a lower cross-member. The crash-box plates are connected directly to the strut plates. The upper and lower cross-members of the front-end unit are made of elements which are separated from each other. The upper cross-member is connected directly to the crash-box plates, whereas the lower cross-member is connected directly to the supports, through which it is connected to the crash-box plates.

2 Claims, 7 Drawing Sheets

MOTOR-VEHICLE FRONT STRUCTURE WITH AN IMPROVED FRONT-END UNIT

CROSS REFERENCE TO RELATED APPLICATIONS

Figure 1:
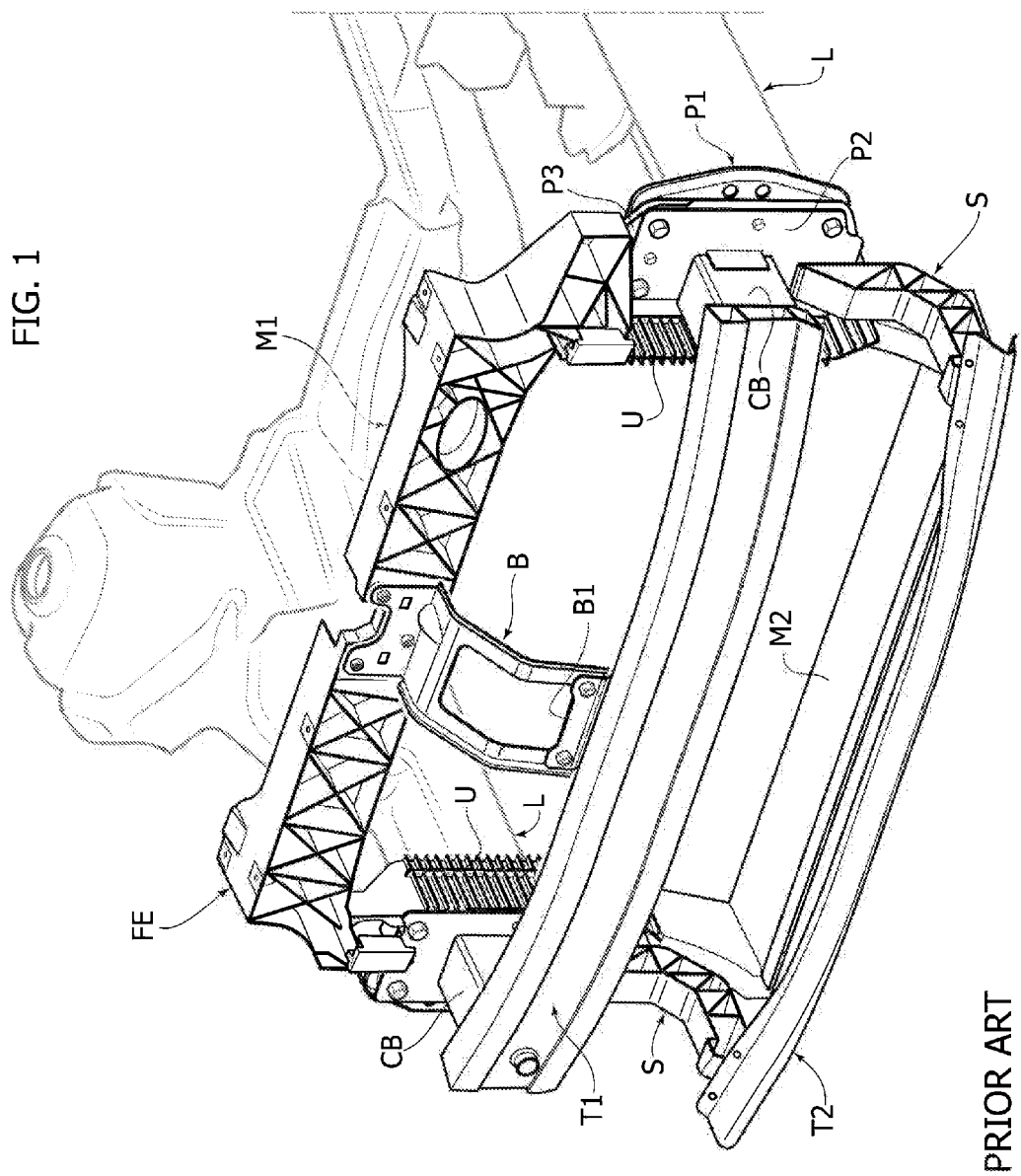

This application claims priority from Italian Patent Application No. TO2014A000418 filed on May 27, 2014, the entire disclosure of which is incorporated herein by reference.

FIELD OF THE INVENTION

The present invention relates to a motor-vehicle front structure, of the type comprising:
- a pair of longitudinal struts, with front ends to which two strut plates are secured,
- a front cross-member located forwardly of the strut plates and having ends provided with two rearwardly facing cross-member plates, which are rigidly connected to said strut plates,
- wherein each cross-member plate is a crash-box plate, connected to said cross-member with the interposition of a crash-box structure,
- wherein said crash-box plates are further connected to an auxiliary lower cross-member, by means of two respective supports each having an upper end connected to the respective crash-box plate and a lower end connected to a respective end of the auxiliary cross-member,
- a front-end unit for supporting one or more motor-vehicle auxiliary components, said front-end unit being interposed between the front cross-member and the strut plates, and including at least an upper cross-member and a lower cross-member constituted of plastic material.

In the past the applicant has developed a motor-vehicle having a structure of the above indicated type, wherein said upper and lower cross-members of the front-end unit form part of a single structure of plastic material incorporating two uprights which connect the upper and lower cross-members of the front-unit to each other. In this prior solution, within the uprights of the front-end unit there are embedded two metal plates which are interposed in the connection between the two crush-box plates and the two strut plates.

Document EP 2 301 825 A2, to which the preamble of annexed claim 1 refers, discloses a motor-vehicle front structure of the same type indicated above, in which the front-end unit has no lower cross-member and in which moreover said crash-box plates are connected directly to said strut plates, without the interposition therebetween of elements forming part of the front-end unit.

A front-end structure is also known from document FR 2 919 567 A1.

OBJECT OF THE INVENTION

The object of the present invention is that of providing a motor-vehicle structure of the type indicated at the beginning of the present description which maintains the advantage which are proper of a front-end unit, among which that of using this unit for supporting motor-vehicle auxiliary components (such as the radiator or components of the air conditioning system), as well as that of contributing to accumulate impact energy in the case of low speed impacts and to enable easier assembling and repairing operations on the motor-vehicle and further having a structure which is simpler and of lower cost and yet provided with suitable characteristics with regard to the structural resistance and the capability of accumulating impact energy.

SUMMARY OF THE INVENTION

In view of achieving the above indicated object, the invention provides a motor-vehicle front structure, comprising a pair of longitudinal struts with front-ends to which two strut plates are secured,
- a front cross-member located forwardly of the strut plates and having ends provided with two rearwardly facing cross-member plates, which are rigidly connected to said strut plates,
- in which each cross-member plate is a crash-box plate, connected to said front cross-member with the interposition of a crash-box structure,
- wherein said crush-box plates are further connected to a lower auxiliary cross-member, by means of two respective supports each having an upper end connected to the respective crash-box plate and a lower end connected to a respective end of the lower auxiliary cross-member,
- a front-end unit for supporting one or more motor-vehicle auxiliary components, said front-end unit being interposed between the front cross-member and the strut plates and including at least an upper cross-member constituted of plastic material,
- wherein said crash-box plates are connected directly to said strut plates, with no interposition of elements forming part of the front-end unit, therebetween,
characterized in that:
- said front-end unit includes, beyond said upper cross-member, at least a lower cross-member also constituted of plastic material,
- said upper and lower cross-members of the front-end unit are constituted by elements which are separated from each other and both connected at their ends to said crash-box plates, the upper cross-member of the front-end unit being an element of plastic material having ends screwed directly to the crash-box plates, and the lower cross-member of the front-end unit being connected to the crash-box plates through said supports.

Due to the above indicated features, the structure of the front-end unit is greatly simplified and has a simpler and more inexpensive construction, while insuring the required characteristics with regard to structural resistance and ability of accumulating impact energy.

In the preferred embodiment, the crash-box plates which are placed in contact directly with the strut plates have upper portions projecting above the strut plates for forming two connecting brackets for connection to the ends of the upper cross-member of the front-end unit. At their bottom, the two crash-box plates are connected to said two supports carrying said lower auxiliary cross-member. In one exemplary embodiment, these supports are constituted by two steel sheets, which are L-shaped, with vertical portions connected to the two crash-box plates and horizontal portions connected to the ends of the lower cross-member of plastic material of the front-end unit.

DETAILED DESCRIPTION OF ONE EMBODIMENT

Figure 2:
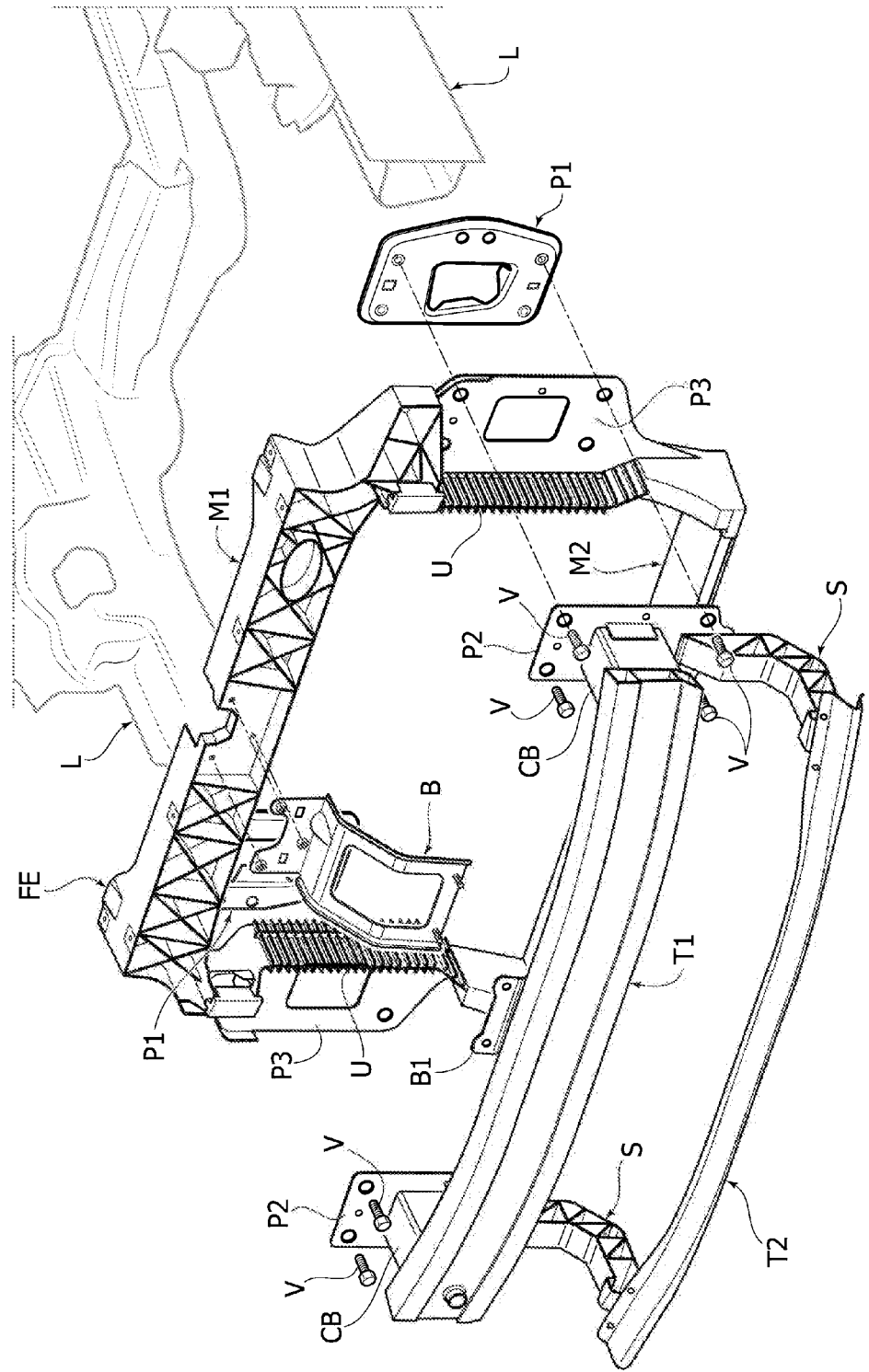
Figure 3:
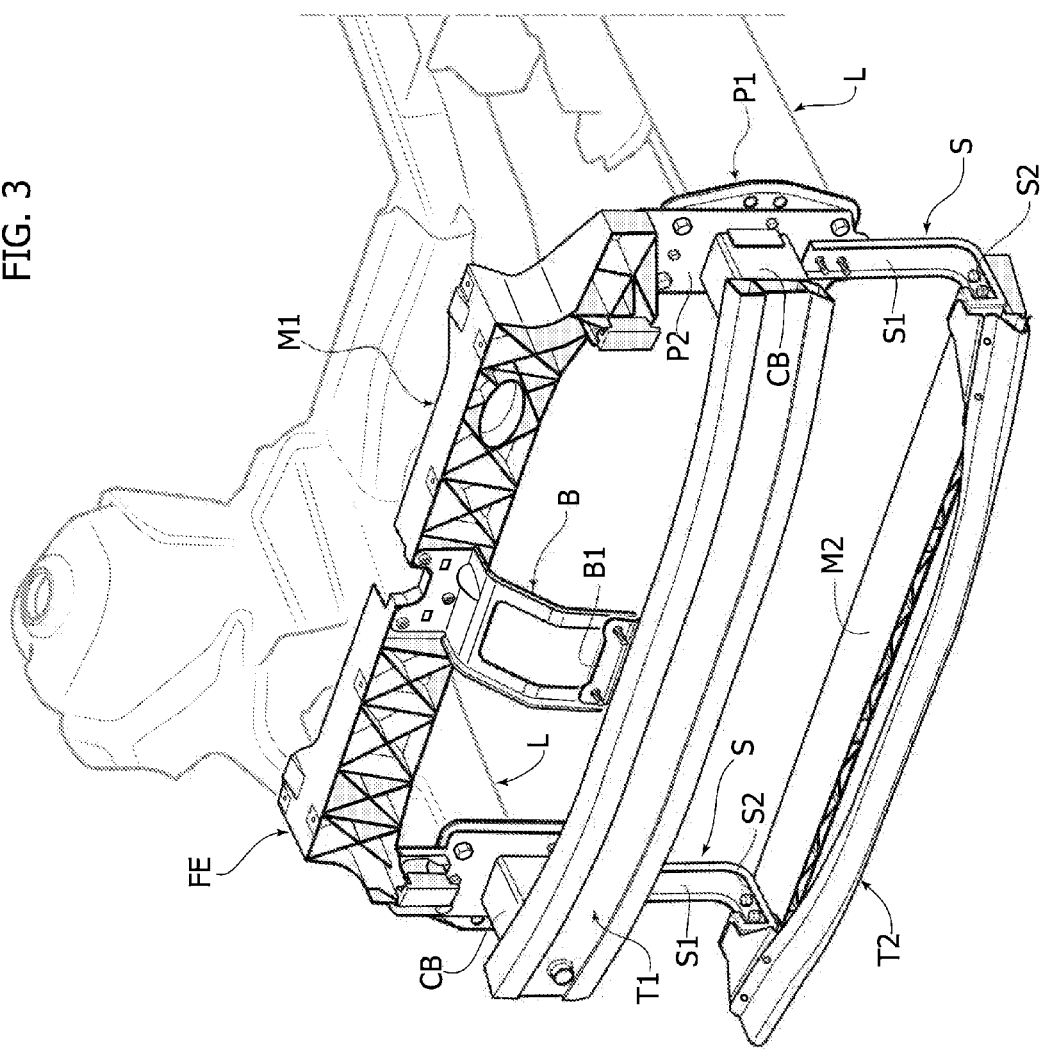
Figure 4:
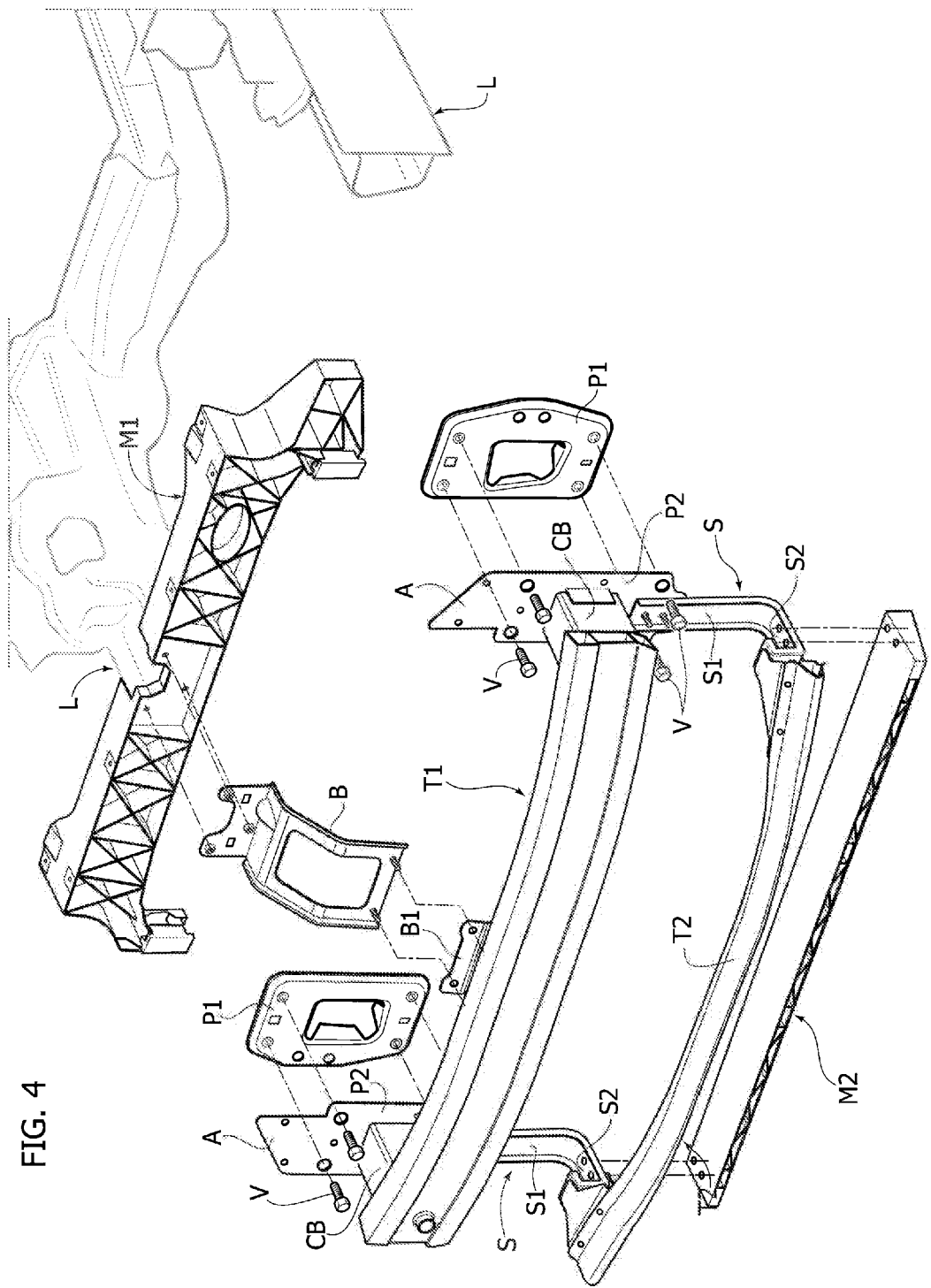
Figure 5:
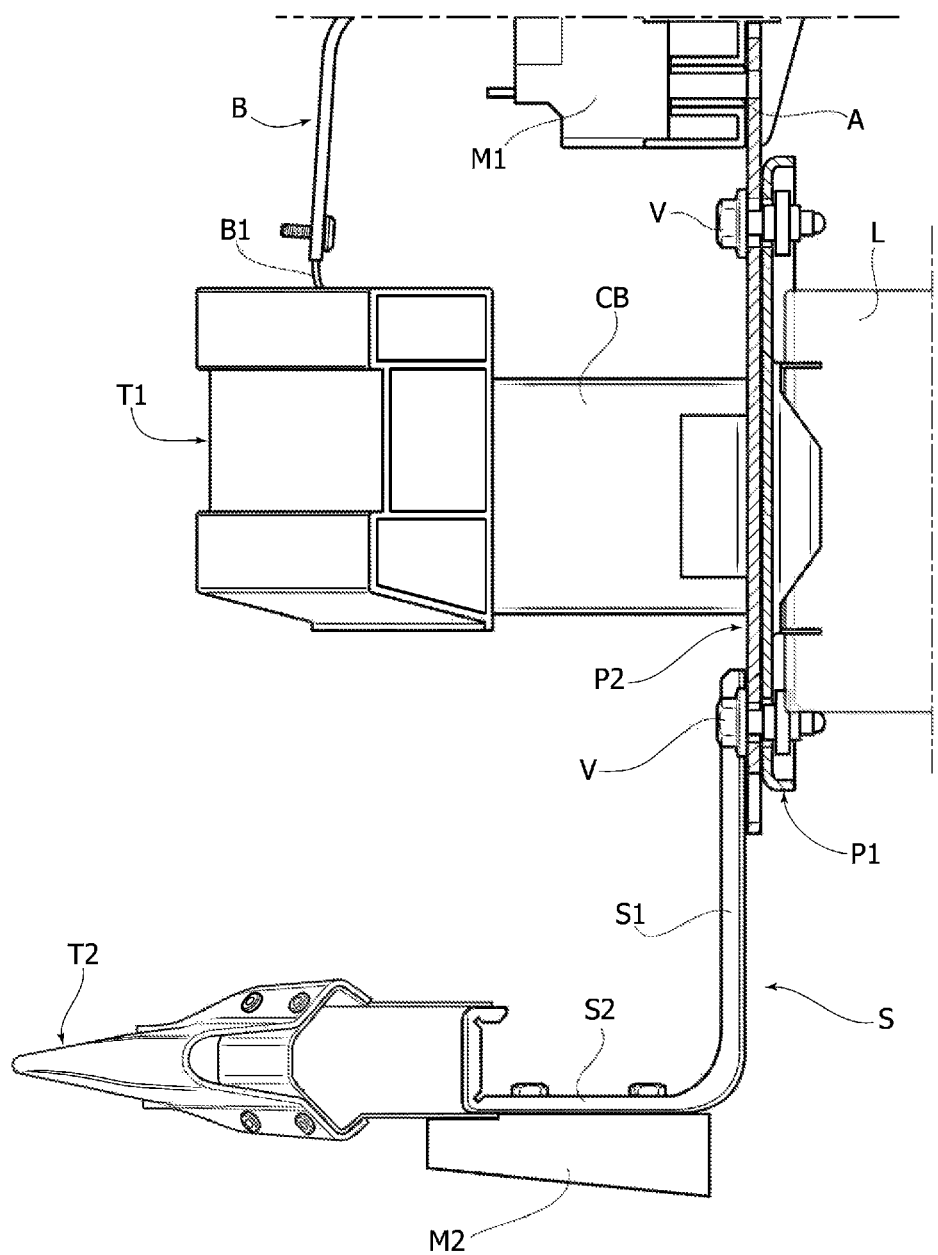
Figure 6:
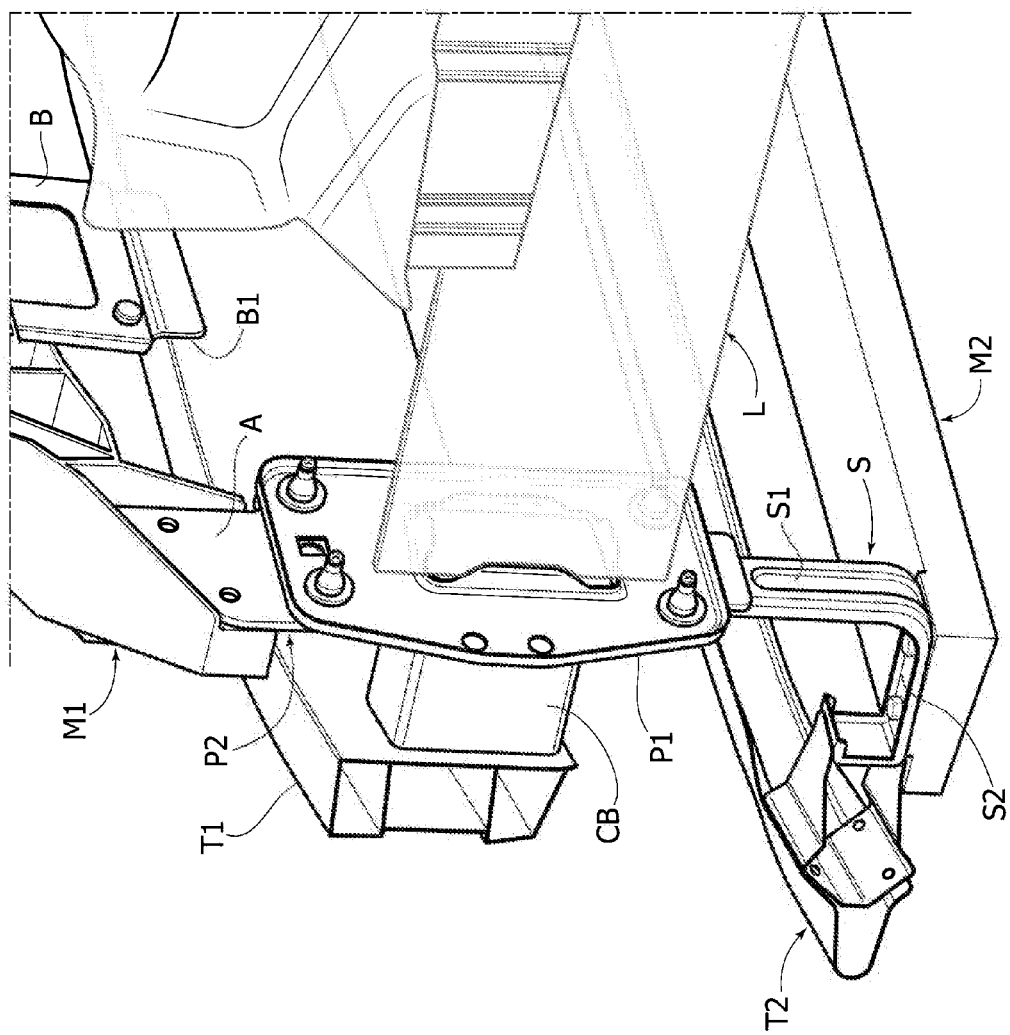
Figure 7:
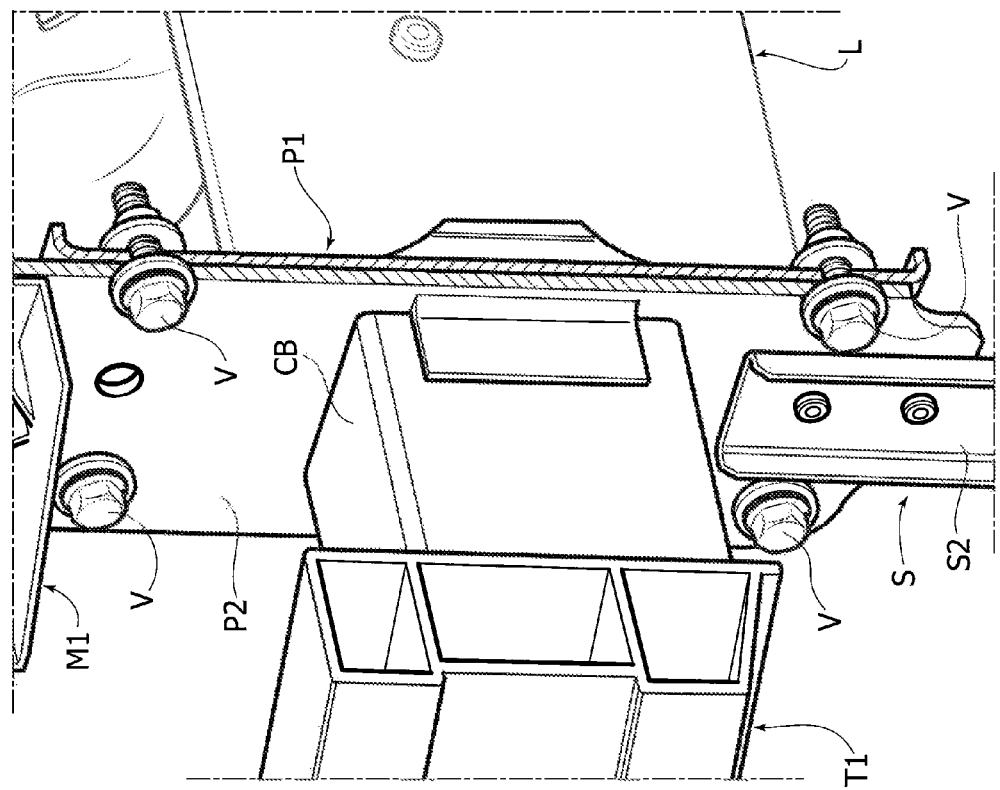

Further features and advantages of the invention will become apparent from the description which follows with reference to the annexed drawings, given purely by way of non limiting example in which:

FIG. 1 is a perspective view of a motor-vehicle front structure made according to a known solution developed by the same applicant, FIG. 2 is an exploded perspective view of the structure of FIG. 1, FIGS. 3, 4 are a perspective view and an exploded perspective view of, the preferred embodiment of the motor-vehicle front structure according to the invention, FIG. 5 is a side view, partially in cross-section, of a detail of the structure of FIGS. 3, 4, and FIGS. 6, 7 are further perspective views of some details of the structure of FIGS. 3, 4.

Referring initially to FIGS. 1, 2, the known solution which has been already discussed in the foregoing and developed by the same applicant is of a type in which the motor-vehicle structure comprises, in a way which is per se conventional, two longitudinal beans L on whose front ends there are secured in any known way (such as by welding) two strut plates P1.

Also according to a technique which is conventional per se, the known structure further comprises a front cross-member T1, made of aluminium and located forwardly of the two strut plates P1. The ends of the front cross-member T1 are connected by means of two crash-box structures CB to two crash-box plates P2. Both plates P2 and the crash-box structures CB are made of aluminium. The crash-box structures CB are configured so as to be adapted to be deformed and thereby accumulating impact energy in the case of low speed impacts.

The two crash-box plates P2 are further connected to a lower auxiliary cross-member T2, made of steel, by means of two side supports S having a structure of aluminium configured for being able to accumulate impact energy. Cross-member T2 is specifically provided for transmitting the impact energy to the two supports S in the case of a low speed front impact against a pedestrian.

Reference FE generally designates a front-end unit for supporting one or more motor-vehicle auxiliary components (not shown). The unit FE is interposed between the front cross-member T1 and the strut plates P1. More specifically, in the case of the known solution shown in FIGS. 1, 2, the front-end unit FE has a single structure of plastic material including a front-end upper cross-member M1, a front-end lower cross-member M2, and two uprights U which connect the ends of the upper and lower cross-members M1, M2 to each other. Within the uprights U of plastic material there are embedded two steel plates P3.

In the above mentioned known solution, the plates P3 forming part of the structure of the front-end unit are interposed in the connection between the crash-box plates P2 and the strut plates P1. This connection is provided by screws V which engage cooperating holes formed in plates P1, P2, P3. Therefore, in the known solution, the crash-box plates P2 are connected to the strut plates P1 with the interposition of plates P3 forming part of the front-end unit.

The connection of the front-end unit to the motor-vehicle structure is completed by a steel bracket B which has one end connected by means of screws to the central part of the upper cross-member M1 of the front-end unit FE and the opposite end connected to a bracket B1 secured to the central part of the front cross-member T1.

The preferred embodiment of the present invention is shown in FIGS. 3-7. A comparison of FIGS. 3, 4 with FIGS. 1, 2 immediately shows the main differences of the invention with respect to the known solution. In these figures, the parts in common to those of FIGS. 1, 2 are designated by the same reference signs.

As shown in the drawings, and in particular in FIG. 4, in the case of the invention the two crash-box plates P2 are directly connected to the two strut plates P1, without any interposition of elements forming part of the front-end unit therebetween.

As clearly shown in FIG. 4, in the case of the invention the plates P3 forming part of the front-end unit according to the known solution have been completely eliminated. In the case of the invention, the front-end unit FE comprises an upper cross-member M1 made of plastic material and a lower cross-member M2 made of plastic material which constitute two elements which are separated from each other and both connected to the two crash-box plates P2. The upper cross-member M1 of the front-end unit FE has its ends connected directly to the two crash-box plates P2. To this end, the two crash-box plates P2, which are placed directly in contact with the two strut plates P1 and are screwed thereto by screws V, include upper portions A projecting above the strut plates P1 in the mounted condition and adapted to form two attachment lugs for screwing thereto of the ends of the upper cross-member M1 of plastic material of the front-end unit. The lower cross-member M2 of plastic material of the front-end unit FE is connected to the crash-box plates P2 with the interposition of the two supports S, which support the auxiliary cross-member T2.

In the case of the embodiment disclosed herein, the two supports S are constituted by two steel sheets, having an L-shape, with vertical portions S1 screwed to the lower ends of the two crash-box plates P2, and two horizontal portions S2 to which the ends of the lower cross-member M2 of plastic material of the front-end unit FE are screwed.

As shown, in the case of the present invention, not only the two plates P3 of the known solution have been totally eliminated, but also the two uprights U of plastic material, forming part of the known front-end unit have been eliminated. As a consequence, the front-end unit according to the embodiment disclosed herein is constituted by two separate components, i.e. the upper cross-member M1 and the lower cross-member M2. However, the possibility is not excluded of providing the two uprights U so as to have a single structure of plastic material including these uprights U and the two upper and lower cross-members M1, M2, being understood that in the case of the present invention plates P3 are completely eliminated, which instead in the known solution are incorporated within the structure of the front-end unit, and being also understood that in the case of the present invention, therefore, the crash-box plates P2 are connected directly and are in contact with the strut plates P1, and that the plates P2 are also used for the connection of the upper cross-member of the front-end unit.

In the case of the embodiment disclosed herein, the central part of the upper cross-member M1 of the front-end unit FE is connected by means of the bracket B to the central part of the front-cross member T1, similarly to the known solution.

Naturally, while the principle of the invention remains the same, the details of construction and the embodiments may widely varying with respect to what has been described and illustrated purely by way of example, without departing from the scope of the present invention.

What is claimed is:

1. A motor-vehicle front structure, comprising:
a pair of longitudinal struts, having front ends to which two strut plates are secured,
a front cross-member placed in front of the strut plates and having ends provided with two rearwardly facing cross-member plates, which are rigidly connected to said strut plates,
wherein each cross-member plate of the cross-member plates, is a crash-box plate, connected to said front cross-member with an interposition of a crash-box structure,
wherein said crash-box plates are connected to a lower auxiliary cross-member, through two respective supports, each of which has an upper end connected to a respective crash-box plate of said crash-box plates and a lower end connected to a respective end of the lower auxiliary cross-member, a front-end unit for supporting one or more motor-vehicle auxiliary components, said front-end unit being interposed between the front cross-member and the strut plates and including at least an upper cross-member formed of plastic material, wherein said crash-box plates are connected directly to said strut plates, with no interposition of elements forming part of the front-end unit therebetween, said front-end unit including at least a front-end lower cross-member formed of plastic material, said upper cross-member and said front-end lower cross-member formed by elements which are separated from each other and both connected at ends thereof to said crash-box plates, the upper cross-member of the front-end unit being an element of plastic material having ends screwed directly to the crash-box plates, and the front-end lower cross-member of the front-end unit being connected to the crash-box plates through said supports; and wherein said supports comprise two L-shaped metal sheets, having vertical portions bolted to the lower ends of said crash-box plates and horizontal portions to which the ends of said front-end lower cross-member are screwed.

2. The structure according to claim 1, wherein said crash-box plates are directly in contact with said strut plates and include upper portions that protrude upwardly above said strut plates, so as to define connecting brackets for connection of the ends of said upper cross-member of the front-end unit.

\* \* \* \* \*